W. W. WYTHE.
SPEED-INDICATOR.
No. 172,363. Patented Jan. 18, 1876.
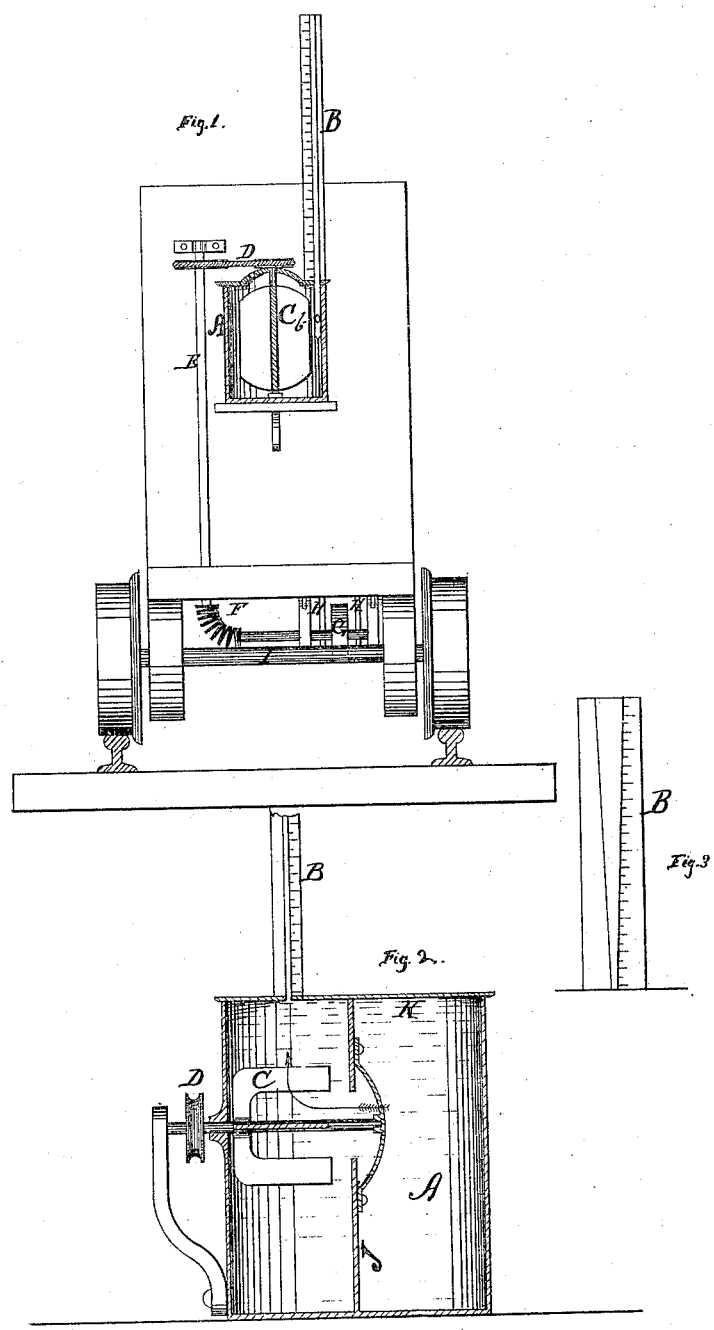

UNITED STATES PATENT OFFICE.

WILLIAM W. WYTHE, OF ERIE, PENNSYLVANIA.

IMPROVEMENT IN SPEED-INDICATORS.

Specification forming part of Letters Patent No. 172,363, dated January 18, 1876; application filed March 6, 1875.

CASE B.

*To all whom it may concern:*

Be it known that I, WILLIAM W. WYTHE, of Erie, in the county of Erie and State of Pennsylvania, have invented certain new and useful Improvements in Speed-Indicators; and I do hereby declare the following to be a full, clear, and exact description of the invention, such as will enable others skilled in the art to which it pertains to make and use it, reference being had to the accompanying drawings, which form part of this specification.

My invention relates to an improved device for indicating the speed of a shaft, designed more especially as a speed-indicator for railroad-trains or locomotives, but is equally applicable in all cases where it is desired to indicate at any moment the speed at which the shaft may be revolving.

My invention consists in a small cylinder containing a flutter-wheel, which wheel is suitably geared with the shaft. The cylinder, being filled with a colored liquid, is forced up a graduated tube by the centrifugal action of the flutter-wheel.

In the drawings, Figure 1 represents my invention attached to the axle of a locomotive or car. Fig. 2 shows another form or variation of my invention, designed to indicate more sensitive variations of speed. Fig. 3 represents a graduated tube, provided with a conical orifice, for use on device shown in Fig. 2.

A is the cylinder; B, a graduated tube, rising therefrom and extending down a short distance into the cylinder. The tube B is provided with a closed bottom, but has an opening, *b*, near its bottom. C is a flutter-wheel, suitably adjusted in the said cylinder, and operated by a pulley-wheel, D, upon its shaft. This pulley-wheel is connected by suitable belting or other gearing to the shaft E. F is a spiral spring, or any other suitable universal coupling, whereby the shaft E is connected with the shaft of the friction-roller G. The friction-roller G is, by suitable springs H or their equivalent, forced against the side of the shaft I, the revolving speed of which is to be indicated.

The tube B or its scale may be graduated to indicate the number of revolutions of the shaft; or it may be graduated to indicate the rate of travel of the train. This graduation, of course, would depend on the object to which the invention was to be applied. The latter graduation would be employed upon a train or moving vehicle, while the former would naturally be employed in determining the revolutions of shafts generally.

The operation of the device shown in Fig. 1 is as follows: The shaft I operates the friction-roller G and its shaft. This, in turn, through the universal coupling F, operates the shaft E, which gives motion to the flutter-wheel C. The cylinder A is filled with a colored liquid, such as oil or water. The motion of the flutter-wheel and the centrifugal force arising therefrom will drive the liquid into the opening *b* and up the graduated tube B, the height of which column will indicate upon the graduated scale the speed of the vehicle or the number of revolutions of the shaft. The tube, being closed at the bottom, will cause the fluid to ascend at a uniform, or nearly uniform, rate for different rates of speed, so that a given increase of speed will be indicated at any point along the scale by a uniform increase in the length of the column. Thus, if the speed were increased from twenty-five to thirty miles per hour, for such increase the column of liquid would ascend through a space on the scale equal to the same space through which it would extend if the speed were increased from ten to fifteen miles per hour.

In cases, however, where the speed of the shaft may vary slightly, and it is desired to show these sensitive changes, the device shown in Fig. 2 may be employed. In this case the flutter-wheel is horizontal, and the tube B does not extend down into the cylinder, and is open at its bottom.

The partition J divides the interior of the cylinder into two parts, with an opening opposite the center or shaft of the flutter-wheel. The centrifugal action of the flutter-wheel will draw the colored liquid into the wheel at its axis, as indicated by the arrow, and will drive it out at its periphery and force it up the tube. This will cause a partial vacuum to be created at K in the inner chamber. The bottom of the tube being open, the liquid will be more readily driven up the tube than it will be in the device shown in Fig. 1, and the liquid will ascend through greater distances for the same speed than in the device shown in Fig. 1. Should the motion be slightly retarded, the liquid will act, by the weight of its column, as well as by the pressure of the atmosphere, caused by the vacuum at K, to descend the scale, and those sensitive changes will be instantly indicated by appreciable changes in the height of the column.

If a tube with a uniform orifice is used in the device shown in Fig. 2, the rate of ascent of the liquid will not be in proportion directly to the speed, but will increase as the speed is increased.

Frequently this ununiform rate will be advantageous; but when it is desired to be uniform, it may be effected by making the orifices conical instead of uniform—that is, larger at the top than at the bottom—and in that way compensate for the increased speed by a corresponding enlargement of the tubular orifices.

What I claim as new is—

1. The speed-indicator, consisting of cylinder or chamber A, graduated tube B, flutter-wheel C, and a liquid, the whole constructed and arranged to operate in the manner substantially as and for the purpose described.

2. The combination, with the flutter-wheel C, of the graduated tube B, closed at the bottom, and provided with an orifice, $b$, substantially as and for the purpose described.

In testimony whereof I have signed my name to this specification in the presence of two subscribing witnesses.

WM. W. WYTHE.

Witnesses:
 FRANCIS TOUMEY,
 H. T. HOWER.